July 30, 1935.  L. W. JOHNSON  2,009,496
METHOD OF MAKING A VALVE GUIDE CLEANER
Filed Feb. 11, 1933  4 Sheets-Sheet 1
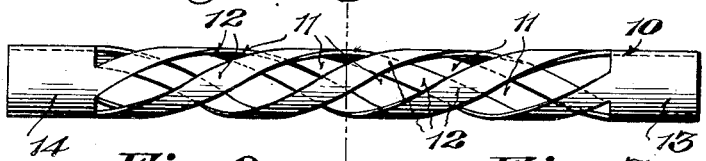
 
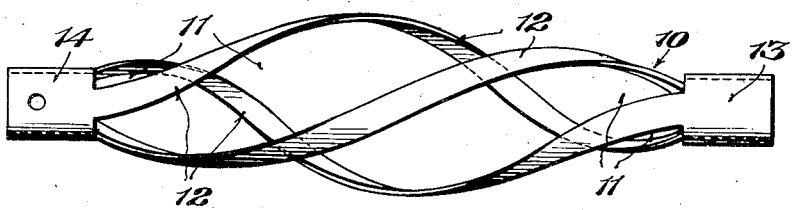
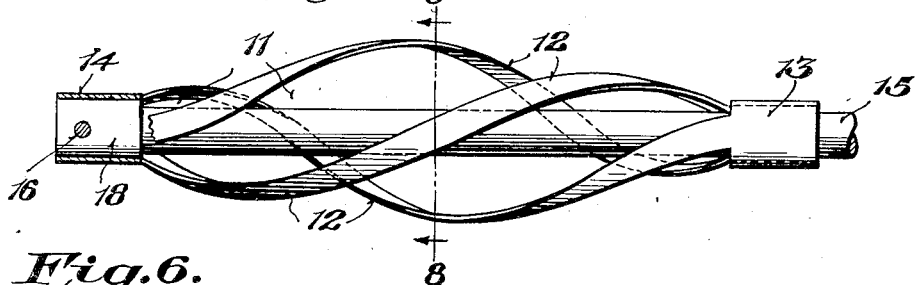
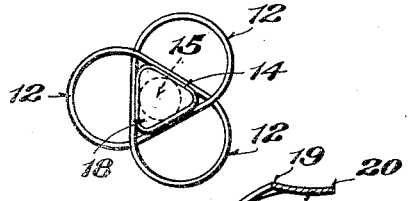 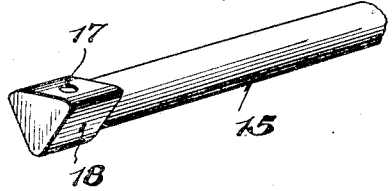
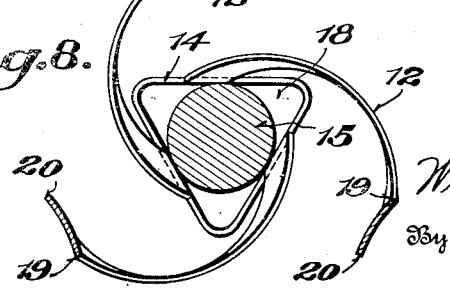
Inventor
Leonard W. Johnson,
By Wilkinson Huxley, Byron T. Knight
Attorneys July 30, 1935. L. W. JOHNSON 2,009,496
METHOD OF MAKING A VALVE GUIDE CLEANER
Filed Feb. 11, 1933 4 Sheets-Sheet 2
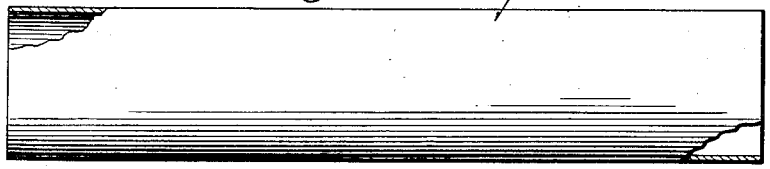
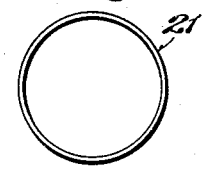
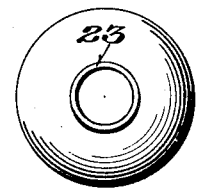
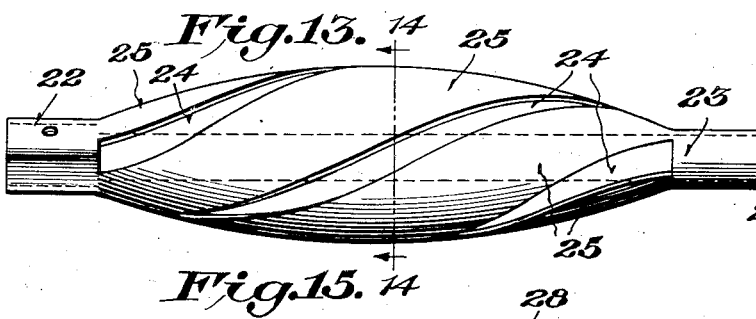
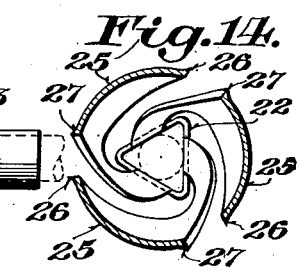
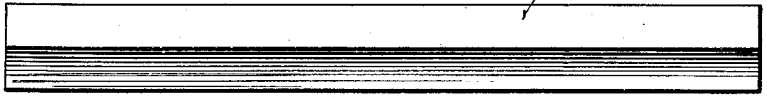
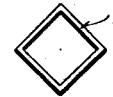
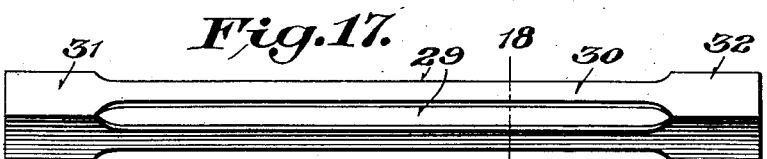
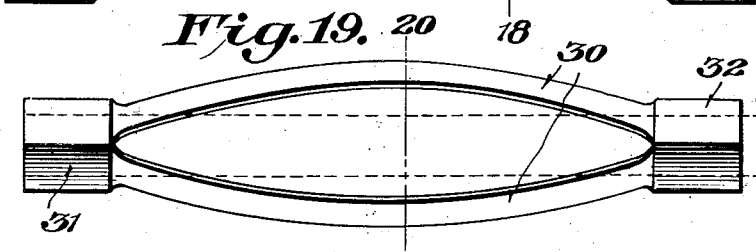
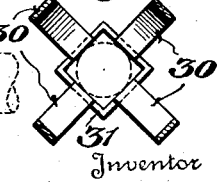
Inventor
Leonard W. Johnson,
By Wilkinson, Huxley, Byron & Knight
Attorneys July 30, 1935. L. W. JOHNSON 2,009,496
METHOD OF MAKING A VALVE GUIDE CLEANER
Filed Feb. 11, 1933 4 Sheets-Sheet 3
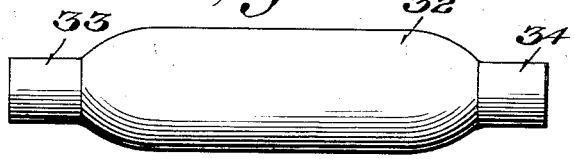
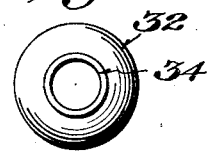
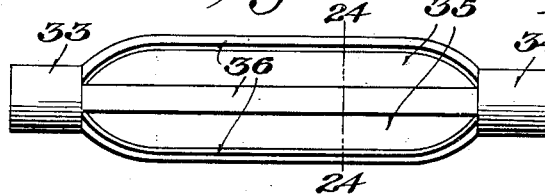
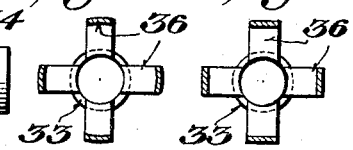
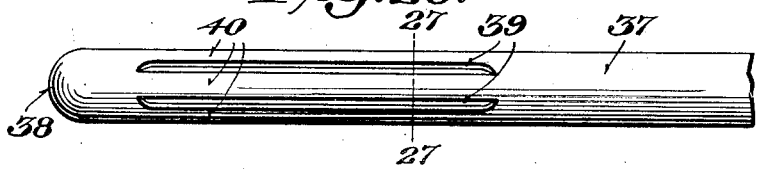
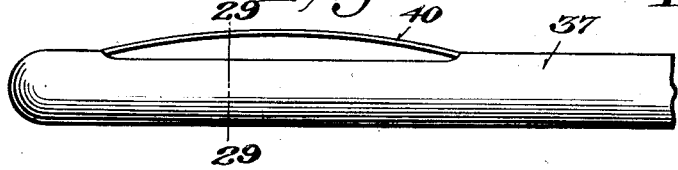
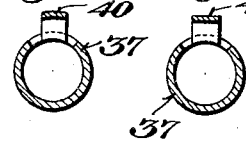
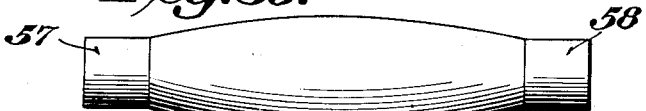
Inventor
Leonard W. Johnson,
By Wilkinson, Huxley, Byron & Knight
Attorneys July 30, 1935.  L. W. JOHNSON  2,009,496
METHOD OF MAKING A VALVE GUIDE CLEANER
Filed Feb. 11, 1933   4 Sheets-Sheet 4
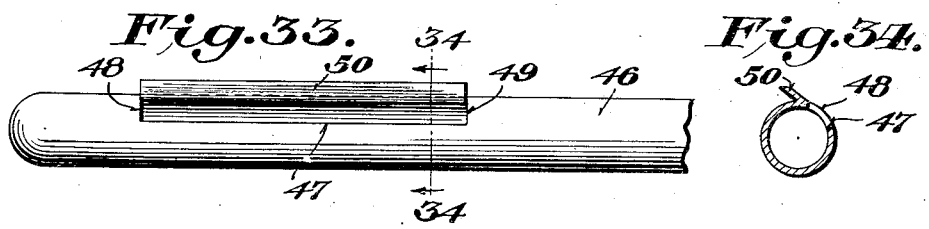
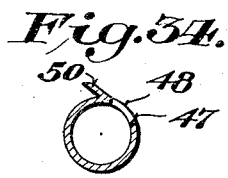
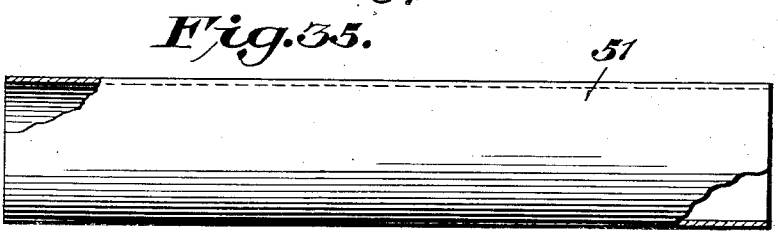
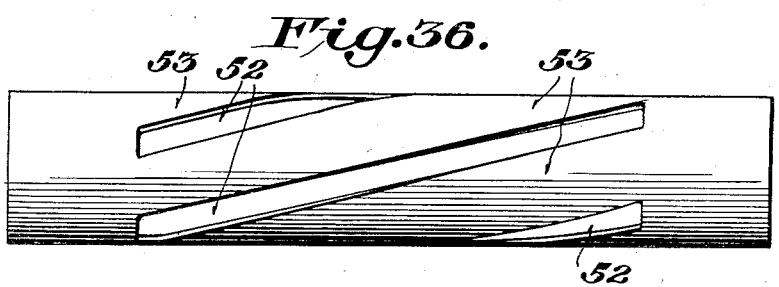
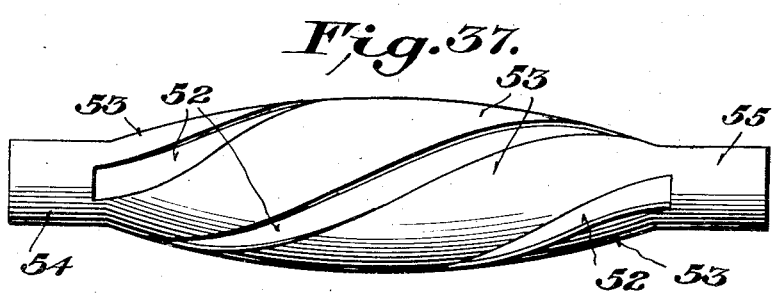
Inventor
Leonard W. Johnson,
By Wilkinson, Huxley, Byron & Knight
Attorneys Patented July 30, 1935

2,009,496

UNITED STATES PATENT OFFICE 2,009,496

METHOD OF MAKING A VALVE GUIDE CLEANER

Leonard W. Johnson, Batavia, Ill.

Application February 11, 1933, Serial No. 656,357

16 Claims. (Cl. 76—104)

This invention relates to a method of making a cleaner device or tool for removing hard accumulations of carbon, dirt, etc., from the walls of openings, more particularly the openings constituting guides for the stems of valves of internal combustion engines.

My improved method is adapted to provide a cleaner head which includes one or more scraper blades, and in which the head is designed to be thrust into an opening with the scraping edge or edges of the blade or blades in cooperative relation with the walls of the openings so that by rotating or endwise reciprocating the head the scraper blades will remove carbon and other accumulations by means of the scraping action of the blades.

It is an important object of the present invention to provide a new and improved method of making a cleaner head of this character which will be simple in construction and effective in operation and which can be made from a single blank of metal in a simple, expeditious and inexpensive manner.

According to the present invention, a tubular blank of soft or annealed tool steel is cut and then deformed, or first deformed and then cut, so as to form one or more scraper blades extending in the general longitudinal direction of the blank, and then the cut and deformed blank is heat treated so as to temper the scraper blades and give them the desired hardness and elasticity. The blades may extend spirally of the blank or substantially straight along the longitudinal dimension thereof. In certain forms of the invention, the head is barrel-shaped, i. e., bulged at its middle with its end portions formed into collars for use in mounting the head on an operating stem or rod.

While I have shown in the accompanying drawings and described in the following specification certain specific embodiments of the invention, it will of course be understood that various changes may be made, in the form, proportion, size and minor details of the device, and in the manner of making the same, within the scope of the claims, without departing from the spirit or sacrificing any of the advantages of the invention.

This application is a continuation in part of my copending application Serial No. 412,693, filed December 9, 1929.

Referring to the drawings:—

Fig. 1 is a side elevation of a cylinder blank cut or having material removed therefrom spirally preparatory to the forming of the blank to provide scraper blades;

Fig. 2 is an end elevation of the blank shown in Fig. 1;

Fig. 3 is a cross-sectional view on the line 3—3 of Fig. 1;

Fig. 4 is a side elevation of the blank of Fig. 1 deforming so as to bulge the blank at its middle and provide a plurality of scraper blades;

Fig. 5 is a side elevation of the cleaner head of Fig. 4 mounted on an operating rod, the collar at the front end of the head being broken away;

Fig. 6 is an end view of the outer end of the cleaner;

Fig. 7 is a fragmentary perspective view of one form of the outer end of the operating rod;

Fig. 8 is an enlarged cross-sectional view on the line 8—8 of Fig. 5;

Fig. 9 is a side elevation, parts being broken away, of a tubular blank employed in another manner of making the cleaner head;

Fig. 10 is an end elevation thereof;

Fig. 11 is a side view showing the tubular blank of Fig. 9 deformed;

Fig. 12 is an end view of Fig. 11;

Fig. 13 is a side elevation showing the deformed blank 11 cut or having metal removed therefrom to form spiral blades thereon;

Fig. 14 is a cross-sectional view on the line 14—14 of Fig. 13;

Fig. 15 is a side elevation of a tubular blank of rectangular cross-section;

Fig. 16 is an end view thereof;

Fig. 17 is a view of the blank shown in Fig. 15 with the corners thereof removed to form blades;

Fig. 18 is a cross-sectional view on the line 18—18 of Fig. 17;

Fig. 19 is a view of the blank of Fig. 17 deformed and bulged at its middle;

Fig. 20 is a cross-sectional view on the line 20—20 of Fig. 19;

Fig. 21 is a side elevation of a blank deformed from a tubular form as employed in another manner of making the cleaner head;

Fig. 22 is an end elevation of Fig. 21;

Fig. 23 is a view of the deformed blank shown in Fig. 21 cut or having metal removed therefrom to form blades;

Fig. 24 is a cross-sectional view on the line 24—24 of Fig. 23;

Fig. 25 is a view similar to Fig. 24 but showing the cleaner or scraping blades flattened;

Fig. 26 is a side elevation of a tubular blank cut for the formation of a cleaner head in a somewhat different manner;

Fig. 27 is a cross-sectional view on the line 27—27 of Fig. 26;

Fig. 28 is a view of the blank shown in Fig. 26 with the blade member bulged therefrom;

Fig. 29 is a cross-sectional view on the line 29—29 of Fig. 28;

Fig. 30 is a view similar to Fig. 29 but showing the blade flattened;

Fig. 31 is a side elevation of a tubular blank cut and deformed to produce a cleaner blade having a single scraping edge;

Fig. 32 is a cross-sectional view on the line 32—32 of Fig. 31;

Fig. 33 is a side elevation of a tubular blank cut and bent to form a single scraping blade;

Fig. 34 is a cross-sectional view on the line 33—34 of Fig. 33;

Fig. 35 is a side elevation of a tubular blank;

Fig. 36 is a side elevation of the blank of Fig. 35 cut diagonally to produce scraper blades;

Fig. 37 is a view of the cut blank of Fig. 36 deformed to form a cleaner head of the present invention;

Fig. 38 is a side view of a tubular blank; and

Fig. 39 is a side elevation of the blank bulged between its ends preparatory to having blades formed therein.

Referring to the form of the invention as illustrated in Figs. 1 to 8 inclusive, Fig. 1 shows a tubular blank 10 provided with a plurality of spirally disposed slots 11 formed by removing metal from the tube in any desired manner, thereby producing a plurality of spiral members 12. The spiral members extend only part of the length of the tube, the end portions 13 and 14 of which remain in their original tubular shape and define collars to which the corresponding ends of the blade members are connected. As illustrated in Fig. 1, it will be seen that the slits or slots 11 are cut through the walls of the cylindrical member 10, at such an angle that the blades 12, which are formed therebetween, extend entirely around the cylindrical member 10 or in other words throughout 360°.

After cutting the blank into the form shown in Fig. 1, the collars 13 and 14 are turned reversely with respect to one another on the axis of the tube which will result in the bulging of the tubular blank at its middle and the separation of the blades 12 into the shape illustrated in Fig. 4.

It will here be explained that the tubular blank is formed of annealed tool steel which will remain set in the position at which it has been deformed as shown in Fig. 4 of the drawings.

The last step consists in assembling the head endwise upon an operating stem 15, and then securing the outer collar 14 to the stem, the inner collar 13 being free to slide and to turn thereon in the operation of the device.

In the form of the blank shown in Fig. 4, the collars 13 and 14 are in their original cylindrical shape, and consequently the blade members 12, where they connect with the collars, necessarily conform to the shape of the collars and are consequently arcuate in cross-section. In the operation of the device, there is considerable flexing of the blades at their connections with the collars, which would either be interfered with by the arcuate shape or the arcuate shape would result in cracking and breaking of the blades at their connections with the collars. To avoid these difficulties, I preferably flatten the sides of the collars and the blades at their connection with the collars. Where there are three blades, as in the present instant, the collars are deformed into triangular shape, as shown in Figs. 6 and 8, so as to have one flat side for each blade and to have the connection between each blade and one side of the collar flat so as to permit the necessary flexing of the blades without damage thereto.

After the blank has been deformed to the shape shown in Fig. 4 and the collars 13 and 14 have been deformed to provide flat sides, the head thus formed is assembled endwise upon an operating stem 15, and the outer collar 14 is fixed to the stem in any suitable manner, as by means of a pin or rivet 16 driven through the collar and into an opening or recess 17 formed in the outer end of the stem which outer end has been deformed into a triangular head 18, best shown in Fig. 7, so as to receive the triangular head 18, best shown in Fig. 7, so as to receive the triangular collar 14 snugly thereon.

It will here be explained that the deforming of the collars 13 and 14 from cylindrical shape to triangular shape or other shape having flattened sides, may be done prior or subsequent to the reversely turning of the collars to bulge the blank at its middle. In this connection it will be explained that if four blades are employed, the collars will be deformed into rectangular shape, and if a larger number of blades are provided then the collars are shaped accordingly so as to have one flat side for each blade.

In reversely turning the collars 13 and 14 to bulge the blank into its final shape, the collars are turned until the blades extend through approximately 240° or about two-thirds of the circle. This turning of the collars not only bulges the blades at the center of the tubular blank but also places the blades under tension, and changes the transverse angular relation of the blades to the longitudinal axis of the cylinder.

When reversely turning the collars 14 to bulge the blank in its middle, if the collars are held in dies or clamps that are held against separation, there will be an undue bulging of the blank at its middle, and therefore it will become necessary to elongate the blank by moving the collars outwardly in opposite direction which changes the curvature of the blades from an abrupt humped portion at the center thereof into an elongated spiral form. The blades preferably at their centers are shaped to a concave form by means of a die or otherwise, thereby enabling the outer edges of the blades to contact with the surfaces to be cleaned.

It will also be understood that the collars 13 and 14 may be moved apart during the reverse turning thereof so as to avoid the separate step of separating the collars after turning the same.

Instead of employing a separate stem 15, as shown in Fig. 5, the cleaner head may be made from a long blank, the blades 11 being formed in one end portion thereof and thus leaving the collar 13 of considerable length so as to form a handle for the manipulation of the tube. Such an arrangement has been indicated in Figs. 26, 28 and 31 of the drawings in connection with a modified form of the cleaner head.

From the foregoing description it will be understood that by reason of the method of the present invention a cleaner head is formed which is larger in diameter than the original diameter of the tubular blank from which the head is formed, and that the blades when formed have their outer edges upturned so that these outer edges constitute scraping edges for the purpose of removing carbon and other accumulations from the walls of an opening, such for instance as those of an opening which constitutes a guide for the shank or stem of the valve of an internal combustion engine.

In order that the blades may have the necessary strength, hardness and resiliency, the head is heat-treated, prior to or after being assembled upon the stem 15, so as to bring the annealed material to the hardness of spring-steel and also substantially the same elasticity thereof. It is necessary to give resiliency or elasticity to the scraper blades in order that the blades may have the necessary pressure against the walls of the opening to be cleaned. The diameter of the cleaner head at its middle is somewhat greater than the diameter of the opening to be cleaned, and when the tool is thrust into the opening, the head will become elongated due to the fact that the outer end thereof is secured to the stem 15 while its lower end is free to slide and turn thereon, and thus the cleaner head will always maintain the desired pressure of the blades against the walls to be scraped.

A somewhat different method of forming a cleaner head is shown in Figs. 9 to 14 inclusive, wherein 21 is a tubular or cylindrical blank which is deformed into the shape shown in Fig. 11 by reducing the diameter of the ends of the blanks to provide collars 22 and 23 similar to the collars 13 and 14 of Figs. 1 to 4 inclusive, the intermediate portion of the blank being deformed into barrel shape. Thereafter spiral slits or slots 24 are formed in the intermediate barrel-shaped portion of the blank by removing the metal in any suitable manner, thereby to form scraper blades 25 extending spirally around the blank and from one collar to the other collar. The collars 22 and 23 may be deformed so as to have flattened sides as described for the collars 13 and 14 and may be done at any time during the deforming of the blank. As shown in Fig. 14 of the drawings, the outer opposite edge portions 26 and 27 of the blades 25 are deformed so as to be deflected outwardly in order to form the necessary scraping edges on the blades as otherwise the outer edges of the blades would constitute arcs of a circle and the edges would have no scraping action upon the walls of the opening to be cleaned.

Still another embodiment of the invention has been shown in Figs. 15 to 20 inclusive, wherein the blank 28 is polygonal in shape, as for instance square or rectangular in cross-section as shown in Fig. 16. This blank is cut or metal removed from the longitudinal edges or corners of the blank so as to form slots 29 between which are the blade portions 30, while the end portions 31 and 32 constitute collars similar to the collars 13 and 14. After being cut into the form illustrated in Figs. 17 and 18, the blade members 30 are bulged outwardly as best shown in Figs. 19 and 20 thereby completing a cleaner head without requiring any deformation of the terminal collars which function in the manner explained for collars 13 and 14 of the form shown in Figs. 1 to 8 inclusive.

It will of course be understood that in the forms of the invention shown in Figs. 9 to 20 inclusive, the original blank is of annealed or relatively soft tool steel, and the head is heat-treated to temper the same after it has been cut and deformed into its final shape, thereby to give the necessary strength, hardness and elasticity to the blades.

Referring now to Figs. 21 to 25 inclusive, 32 designates a tubular or cylindrical blank which has been deformed from an original blank of the shape shown in Fig. 9 so as to have its intermediate portion cylindrical throughout the greater portion of its length, with its ends deformed and reduced in diameter to produce collars 33 and 34 similar to the collars 13 and 14 of Fig. 1. The cylindrical body portion of the blank is then cut longitudinally, as indicated at 35 in Fig. 23, so as to form substantially straight longitudinal scraper blades instead of the spirally arranged blades as shown in Figs. 5 and 13. Fig. 19 of course discloses substantially straight blades, as distinguished from spiral blades, but the blades of Fig. 19 are bulged at the middle of the blank or arcuate from end to end, whereas the blades 36 of Fig. 23 are straight throughout a greater portion of their length while their end portions are bowed inwardly to the collars 33 and 34. While these collars have been shown cylindrical in Figs. 21 to 25 inclusive, it will of course be understood that these collars may be flattened, as described for Figs. 1 to 8 inclusive, in accordance with the number of blades employed. In Fig. 24 it will be seen that the blades are of course bowed or arcuate transversely, due to the shape of the blank, and therefore it will be understood that these blades are flattened transversely as shown in Fig. 25 so as to give the necessary scraping edges to the blades.

In Fig. 26 there has been shown a tubular blank 37, preferably closed at one end as illustrated at 38, and this blank is provided with a pair of longitudinal slits or slots 39 by removing the metal from the blank in any suitable manner, thereby to define a scraper blade 40 lying between the slots. As shown in Figs. 28 to 30 inclusive, the blade portion 40 is bulged outwardly to form a blade which extends longitudinally of the blank, but which is bowed or bulged outwardly therefrom. This blade 40 is of course arcuate in cross-section as shown in Fig. 29 and therefore it is flattened transversely as shown in Fig. 30 to produce the necessary scraping edges.

In Fig. 31 there has been shown a blank 41 preferably having a closed end 42 similar to the blank shown in Fig. 26, and then a single slit or slot 43 is formed longitudinally of the blank, and at the inner or rear end of the longitudinal slit there is provided a short transverse slit 44, after which the portion 45 of the blank is deformed and bent outwardly to form a scraper blade having a single scraping edge as best illustrated in Fig. 32.

In Figs. 33 and 34 there has been shown a tubular blank 46, similar to that shown in Figs. 26, 28 and 31, and in which a single longitudinal slit 47 is made and at the ends of this slit, the blank is slit transversely as at 48 and 49, the material of the tube between the slits being bent outwardly forming a single scraper blade 50.

In the form of the invention illustrated in Figs. 35 to 37 inclusive, 51 designates a tubular blank such as shown in Fig. 1 or Fig. 9 of the drawings, and in this blank, before any deformation thereof, a series of spiral slots 52 are provided by removing the material of the tube in any desired manner, thereby defining blade members 53. After the cutting operation, the blank is deformed either by bulging it at its middle or reducing it in diameter at its ends into the form shown in Fig. 37 thereby producing spiral blades and terminal collars 54 and 55 which may be flattened as hereinbefore described in accordance with the number of scraper blades provided in the blank. It will of course be understood that where the blank is bulged at its middle, the original diameter of the blank will be less than that shown in Figures 35 and 36 and of the size of the terminal collars 54 and 55. The bulging of the blank may be accomplished by reversely turning the ends of the blank or by any other desired manipulation of the blank.

In the form of the invention as disclosed in Figs. 26 to 34 inclusive, a separate stem is not employed, as the blank is long enough to constitute a handle for the manipulation of the cutter head portion thereof.

In Figs. 38 and 39 there has been shown a tubular blank 56 which is deformed into the shape shown in Fig. 39 by bulging the intermediate portion of the blank to a greater diameter, the end portions 57 and 58 remaining intact and constituting collars similar to the collars 13 and 14. It will of course be understood that the intermediate portion of the blank may be cut spirally as in Fig. 13 or longitudinally as in Fig. 23. The difference between the forms shown in Figs. 9 to 14 inclusive and 21 to 25 inclusive on the one hand and Fig. 39 on the other hand, is that in Fig. 39 the blank is bulged to a greater diameter, whereas in the other figures the ends of the blank are reduced, otherwise the procedure is the same.

It will now be understood that as illustrated in Figures 1 and 17, the blank is first cut and then deformed, whereas in Figure 13 as well as in Figure 39, it will be understood that the blank is first deformed, and then cut, and therefore it is apparent that, so far as the broad aspect of the present invention is concerned, the order of the steps of cutting and deforming is immaterial, and therefore where the expression "cutting and deforming" is employed in the claims, it is intended to mean either first cutting and then deforming or first deforming and then cutting.

What is claimed is:

1. A method of making a cleaner which comprises forming a plurality of spirally extending blades from a hollow cylindrical member, deforming the same to barrel shape to place the said blades under tension and hardening the blades thus formed by heat treating.

2. A method of making a cleaner which comprises forming a cleaner head having a plurality of spirally extending blades from a cylinder, decreasing the angle of direction of the blades, elongating the said head, and mounting the said head on a stem.

3. A method of making a cleaner which comprises forming a cleaner head from a hollow cylindrical member by cutting a plurality of spirally extending blades intermediate the ends thereof, shaping the ends of the head to form a flat surface at the juncture of the blades with the ends, and deforming the cylindrical member to barrel shape.

4. A method of making a cleaner which comprises cutting a cylindrical blank in a spiral direction intermediate its ends to form blades, turning one end of the cut blank and thereby bulging the blade portion into barrel shape, and heat treating the blades to temper them.

5. A method of making a cleaner head which comprises cutting spiral blades upon a cylinder, bulging and elongating the blades, changing the transverse angular relation of the blades to the longitudinal axis of the cylinder and heat treating the blades to temper the same.

6. A method of making a cleaning device which comprises cutting strips in spiral direction from a pipe section, turning one end of the pipe section to bulge the cut portion thereof and change the angle of the blades formed thereon, elongating the blades, and mounting the device upon a stem.

7. A method of making a cleaner head, which comprises removing portions of the wall of a tubular steel body in a spiral direction intermediate the ends, the remaining wall portions constituting scraper blades having opposite longitudinal scraping edges, decreasing the angle of the blades thus formed, and heat treating the blades.

8. A method of making a cleaner head, which comprises cutting out portions of the wall of a tubular steel body in a spiral direction intermediate the ends, the remaining wall portions constituting scraper blades having opposite longitudinal scraping edges, turning the end portions of the head with respect to each other to bulge the blades outwardly, and heat treating the head thus formed.

9. A method of making a cleaner head, which comprises cutting out a plurality of wall sections of a tubular steel body in a generally longitudinal direction intermediate the ends, the remaining wall portions constituting scraper blades having opposite longitudinal scraping edges, turning the end portions with respect to each other whereby the angle of the blades is decreased, and heat treating the head to temper the blades.

10. A method of making a cleaner head, which comprises cutting out a plurality of wall sections of a tubular steel body in a spiral direction intermediate the ends, turning the end portions with respect to each other whereby the angle of the blades is decreased, elongating the blades, and heat treating the head to temper the blades.

11. A method of making a cleaner head, which comprises removing portions of the wall of a tubular steel member intermediate its ends to form slots, the remaining wall portions between the slots constituting scraper blades having opposite longitudinal scraping edges, and expanding the slotted portion of the tubular member to a diameter larger than the end portions thereof.

12. The herein described method of making cleaner heads, which comprises providing a tubular member having slots extending in the general direction of the length of the member, deforming the slotted portion of the member by expanding the diameter thereof to form blades, and heat treating the blades to temper the same.

13. The herein described method of making cleaner heads from a thin walled open ended hollow blank which comprises cutting and deforming the blank by expanding the diameter thereof to form slots defining blades between the slots.

14. The herein described method of making cleaner heads, which comprises taking a hollow cylindrical blank and cutting and deforming the blank into a barrel shaped cleaner head having slots defining blades.

15. The herein described method of making cleaner heads, which comprises taking a hollow cylindrical blank, cutting and deforming the blank into a barrel shaped body having slots defining blade members therebetween, and deforming the blade members to provide outstanding scraping edges thereon.

16. The herein described method of making a cleaner head, which comprises taking a thin walled hollow metallic member elongated in form and open at opposite ends, removing portions of the walls of said member intermediate its ends and extending longitudinally of the blank to form longitudinally extending blades, and expanding the blade portion of the member to a diameter greater than that of the end portions of the member.

LEONARD W. JOHNSON.